United States Patent
Lee et al.

[11] Patent Number: 6,111,695
[45] Date of Patent: Aug. 29, 2000

[54] OPTICAL CIRCULATOR

[75] Inventors: K. Roger Lee, Tainan Hsien; Song-Fure Lin, Hsinchu; Chien-Hsiung Chiu, Kaohsiung; Jing-Yuan Lin, Taipei Hsien, all of Taiwan

[73] Assignee: FOCI Fiber Optic Communications, Inc., Hsinchu, Taiwan

[21] Appl. No.: 09/133,727

[22] Filed: Aug. 13, 1998

[51] Int. Cl.[7] ............................................. G02B 5/30
[52] U.S. Cl. ........................ 359/484; 359/497; 385/11
[58] Field of Search ............................ 359/483, 484, 359/494, 497; 385/11

[56] References Cited

U.S. PATENT DOCUMENTS

5,204,771  4/1993  Koga ........................................ 359/483
5,936,768  8/1999  Oguma ...................................... 359/484

*Primary Examiner*—Cassandra Spyrou
*Assistant Examiner*—Euncha Cherry

[57] ABSTRACT

An optical circulator having reduced size and low polarization mode dispersion is disclosed. A transparent optical circulator comprises a first birefringent crystal, a first pair of Faraday polarization rotators having two Faraday polarization rotators aligned in parallel with the propagation direction of an optical signal, a second birefringent crystal, a second pair of Faraday polarization rotators similar to the first pair of Faraday polarization rotators, and a third birefringent crystal. The optical circulator with a reflector or an input/output device and the Faraday rotators together reduce the total size of the circulator, increase the number of input/output ports, and improve the propagation quality of the optical signal by decreasing the polarization mode dispersion. A reflective optical circulator is also presented.

2 Claims, 10 Drawing Sheets

OPTICAL CIRCULATOR

FIELD OF THE INVENTION

The present invention relates to an optical circulator, and more particularly, to transparent or reflective circulators having a plurality of input/output ports, reduced size and improvement in polarization mode dispersion due to the difference in optical paths.

BACKGROUND OF THE INVENTION

There are two typical optical circulators in the prior arts, including transparent and reflective circulators. The input optical signal incident onto one of the input/output ports of the circulator is split into ordinary and extraordinary rays, and the two rays are converted into output signals respectively and then transmitted onto another desired input/output port. Those incident lights from different ports are transferred to other ports associated such that a sequential order of the input/output ports for transformation of optical signal is constructed and the function of the circulator is achieved.

Figure 1:
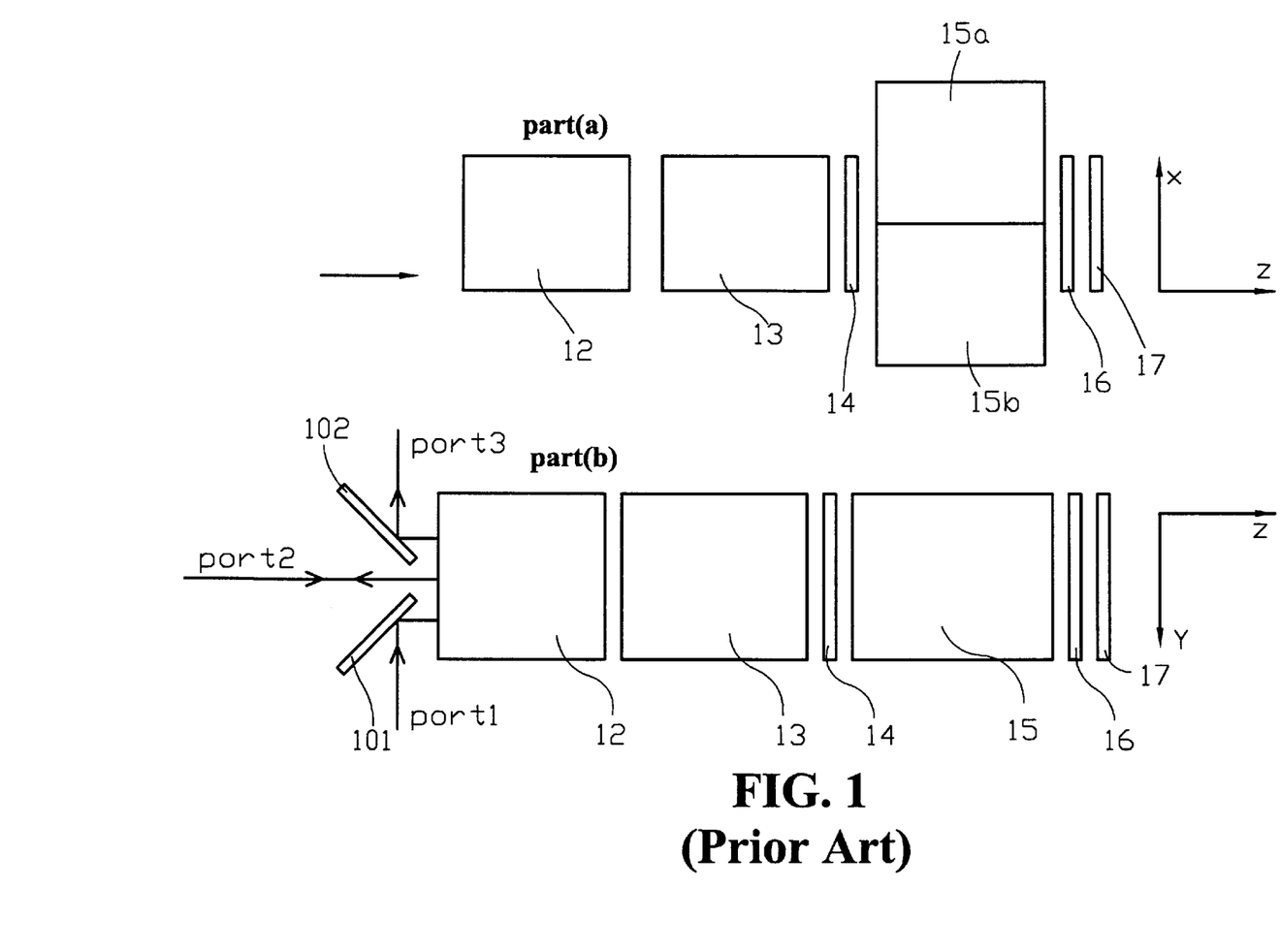
FIG. 1 shows a schematic diagram of a transparent optical circulator in the prior arts.

With reference to FIG. 1, a reflective optical circulator in the prior arts includes two reflective input/output devices 101 and 102, a first front birefringent crystal 12, a second front birefringent crystal 13, a first Faraday polarization rotator 14, a set of back birefringent crystals 15, a second Faraday polarization rotator 16, and a mirror with dielectric coating 17. The set of back birefringent crystals 15 further consists of two crystals 15a and 15b aligned in the X direction. The optic axes of the two crystals 15a and 15b are in the −Y and Y direction respectively, i.e., the crystal 15a is at an upper position if the X direction is defined to be upper as shown in FIG. 1(A). The angle between the optic axis of the first front birefringent crystal 12 and the Y-axis is 45 degrees, and the angle between the optic axis of the second front birefringent crystal 13 and the Y-axis is −45 degrees.

Figure 2:
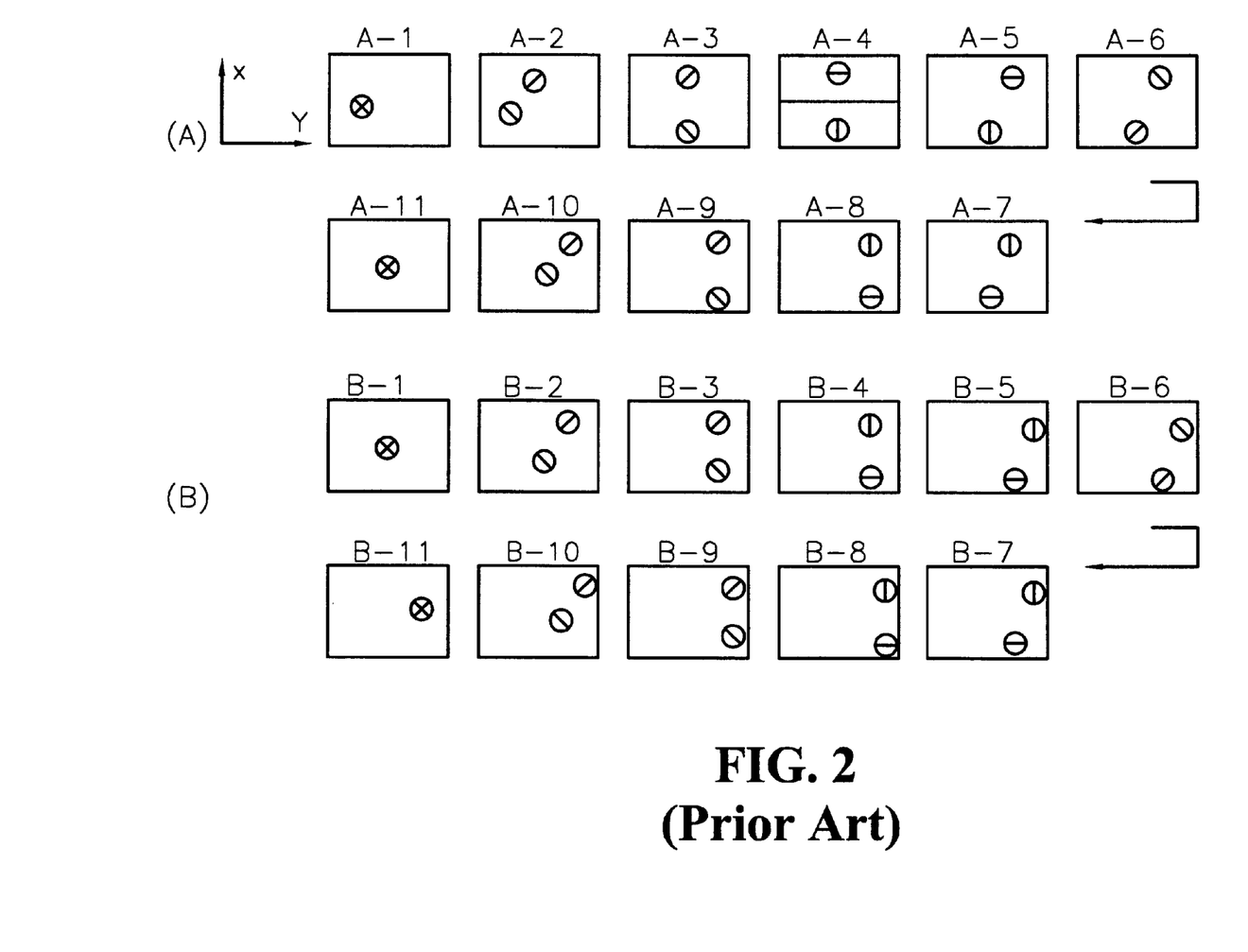
FIG. 2 illustrates the spot position of the optical signal on the respective optical component in FIG. 1.

With reference to FIG. 2, the optical points on the circulator in FIG. 1 are shown, where FIG. 2(A) illustrates the respective spot positions and the optic axes of the ordinary and extraordinary rays on each optical component for the conversion from port 1 to port 2, and FIG. 2(B) from port 2 to port 3.

For an incident light onto port 1, the optical signal for the forward path passes through the first front birefringent crystal 12, the second front birefringent crystal 13, the first Faraday rotator 14, the set of back birefringent crystals 15, and the second Faraday rotator 16, and their respective positions and optic polarization states are shown in A-1, A-2, A-3, A-4, A-5, and A-6 respectively.

Subsequently, the ordinary and extraordinary rays are reflected by the mirror 17, and pass through the second Faraday rotator 16, the set of back birefringent crystals 15, the first Faraday rotator 14, and the second front birefringent crystal 13, to the first front birefringent crystal 12. The respective positions and optic polarization states are shown in A-7, A-8, A-9, A-10, and A-11. The two split rays, ordinary and extraordinary, are combined into a single ray, so a complete conversion from port 1 to port 2 is accomplished.

The conversion from port 2 to port 3 is similar to the above-mentioned process from port 1 to port 2. The respective positions and the optic polarization states are shown in B-1, B-2, B-3, B-4, B-5, B-6, B-7, B-8, B-9, B-10, and B-11. Finally, the two rays are combined into a single ray onto port 3 as a resulting output signal. Thus, a complete conversion from port 2 to port 3 is accomplished. The number of optical components in the prior arts are too many and the size of the circulator is relatively large because of employing two front birefringent crystals (12 and 13), and two back crystals (15a and 15b). Therefore, both the size of the circulator and the material cost can not be reduced.

SUMMARY OF THE INVENTION

The primary object of the present invention is to provide a modified optical circulator with reduced component size and increased isolation. Another object is to increase the number of input/output ports for the circulator without greatly increasing the size of the circulator. Yet another object is to decrease the polarization mode dispersion due to the difference in the optical paths so that the quality of output optical signal after the conversion is further improved.

According to this invention, a transparent circulator comprises a first birefringent crystal, a first pair of Faraday polarization rotators consisting of two rotators, a second birefringent crystal, a second pair of Faraday polarization rotators consisting of two rotators aligned in the X-axis direction, and a third birefringent crystal. Reflective input/output devices are used to transform the incident light onto the circulator in order to increase the number of the input/output ports.

The reflective circulator of this invention includes two reflective input/output devices, a first front birefringent crystal, a second front birefringent crystal, a pair of first Faraday polarization rotators, a back birefringent crystal, a pair of second Faraday polarization rotators, and a reflective plate. A reflective input/output device having a plurality of oblique planes can be used to guide the incident light onto the circulator so that the number of the input/output ports may increased.

Other features and advantages of the present invention will become apparent after the following description which refers to the accompanying drawings.

DETAILED DESCRIPTION OF THE PREFERRED EMBODIMENTS

Figure 3:
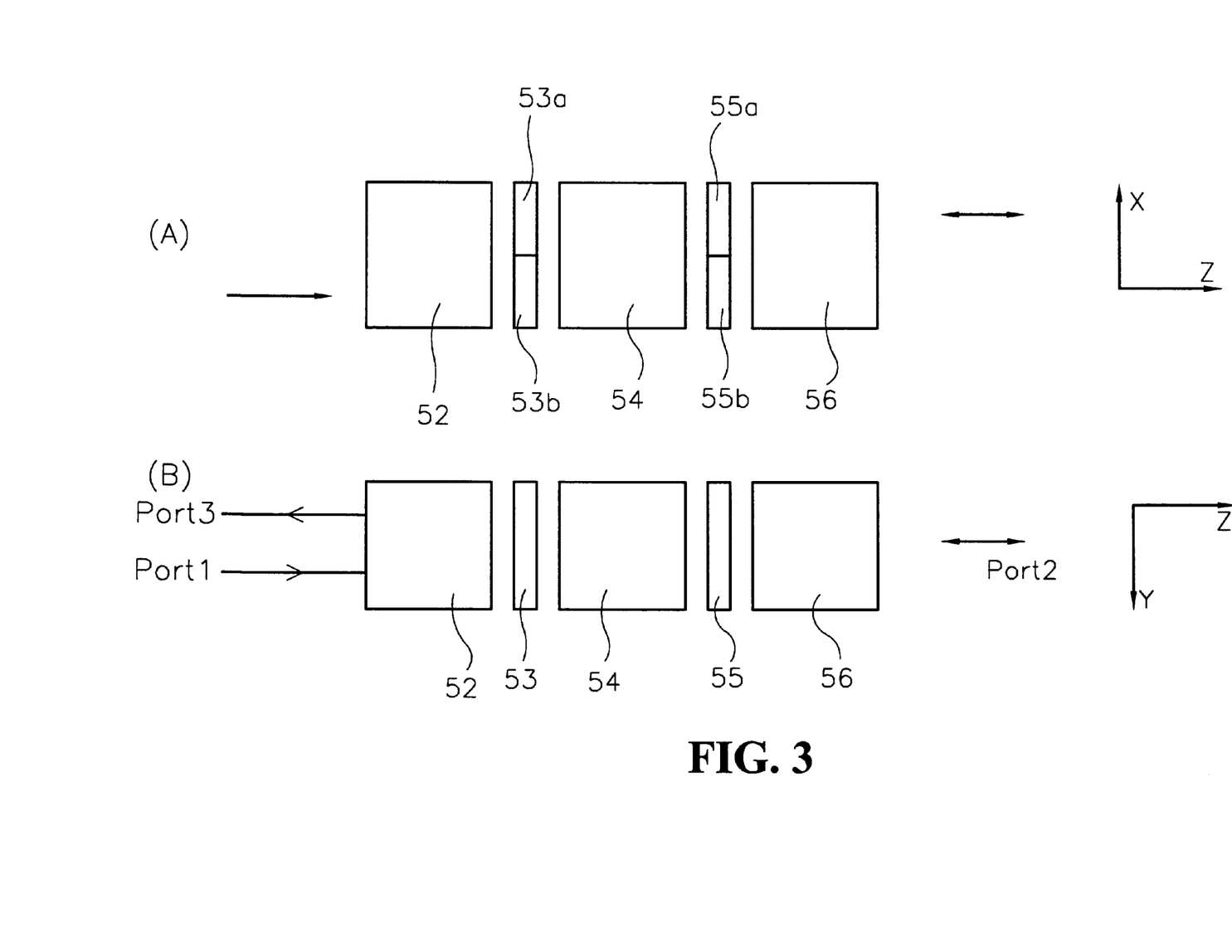
FIG. 3 shows a schematic diagram of a first embodiment of the transparent circulator in the present invention.

With reference to FIG. 3, a transparent optical circulator as a first embodiment in the present invention is shown in the x-z plane as part (A) and in the y-z plane as part (B). The circulator comprises a first birefringent crystal 52, a first pair of Faraday polarization rotators 53 consisting of two first Faraday rotators 53a and 53b, a second birefringent crystal 54, a second pair of Faraday polarization rotators 55 consisting of two second Faraday rotators 55a and 55b aligned in the X-axis direction, and a third birefringent crystal 56. The corresponding direction of rotation for the two first Faraday polarization rotators 53a and 53b are 45 degrees clockwise and counter clockwise respectively. The optic axis of the first birefringent crystal 52 is 45 degrees to the Y-axis, the optic axis of the second birefringent crystal 54 is in the negative Y-axis, and the optic axis of the third birefringent crystal 56 is 45 degrees to the Y-axis.

Figure 4:
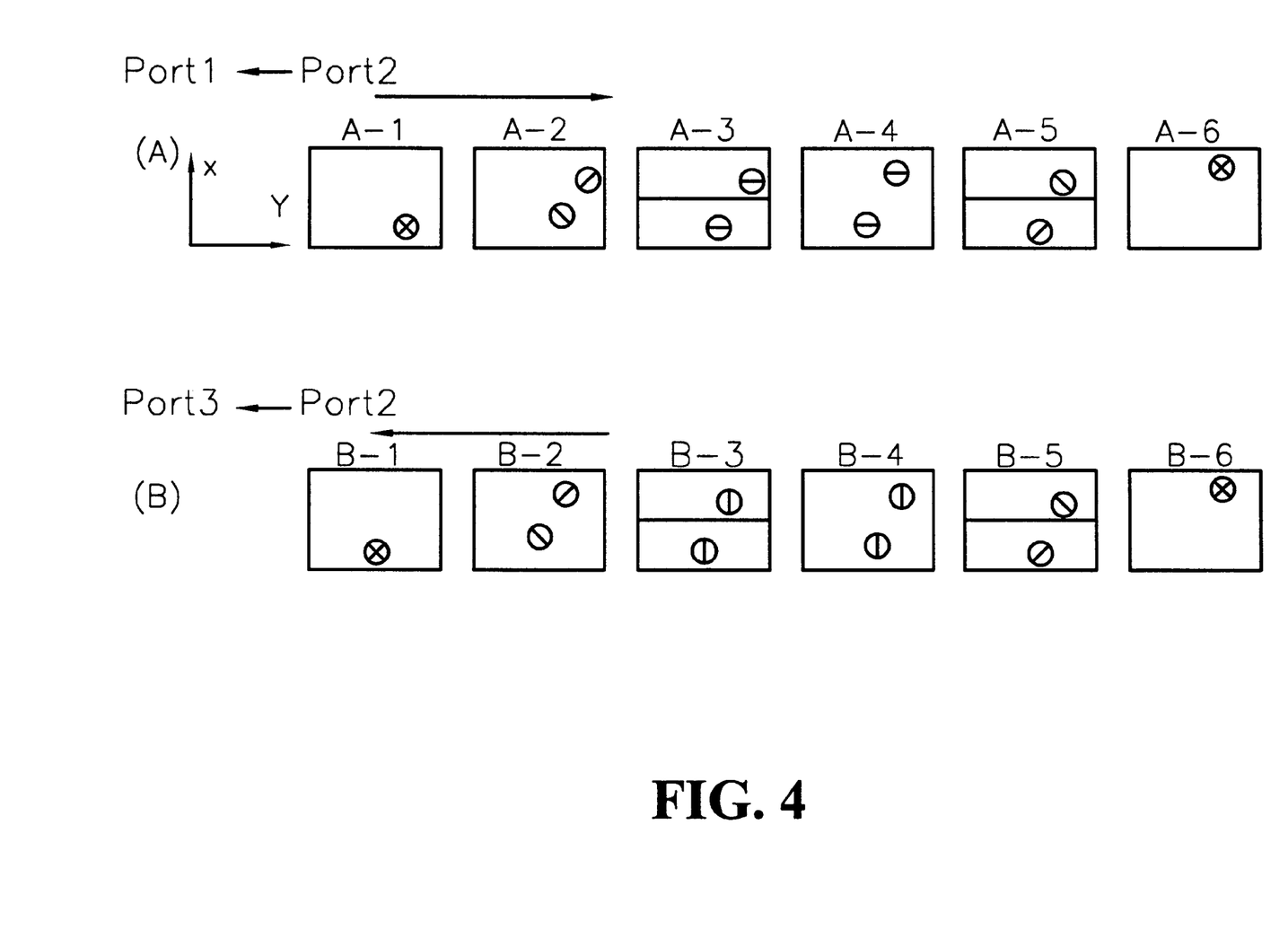
FIG. 4 illustrates the spot position of the optical signal on the respective optical component in FIG. 3.

FIG. 4 shows the respective spot positions and optic polarization states for the ordinary and extraordinary rays on the optical components in FIG. 3, where Part (A) and part (B) of FIG. 4 illustrate the conversions from port 1 to port 2 and from port 2 to port 3 respectively. The propagation of the incident light for (A) is in the z-direction and the propagation for (B) is in the negative z-direction.

For an incident light onto port 1, the optical signal passes through the first birefringent crystal 52, the first pair of Faraday rotators 53, the second birefringent crystal 54, the second pair of Faraday rotators 55, and the third birefringent crystal 56, and their respective positions and optic polarization states are shown in A-1, A-2, A-3, A-4, A-5, and A-6. Finally, the two split rays, ordinary and extraordinary, are combined into a single ray onto port 2 to complete the conversion from port 1 to port 2.

The conversion from port 2 to port 3 is similar to the above-mentioned conversion from port 1 to port 2. The incident light onto port 2 passes through the third birefringent crystal 56, the second pair of Faraday rotators 55, the second birefringent crystal 54, the first pair of Faraday rotators 53, and the first birefringent crystal 52, and their respective positions and optic polarization states are shown in B-6, B-5, B-4, B-3, B-2, and B-1 respectively. Finally, the two split rays, ordinary and extraordinary, are combined into a single ray onto port 3 to complete the conversion from port 2 to port 3. There are two pairs of Faraday rotators in the transparent circulator, which are vertically stacked and have opposite rotating directions so that the number of the required birefringent crystals is less than the conventional circulator and the cost is reduced with less insertion loss.

Figure 5:
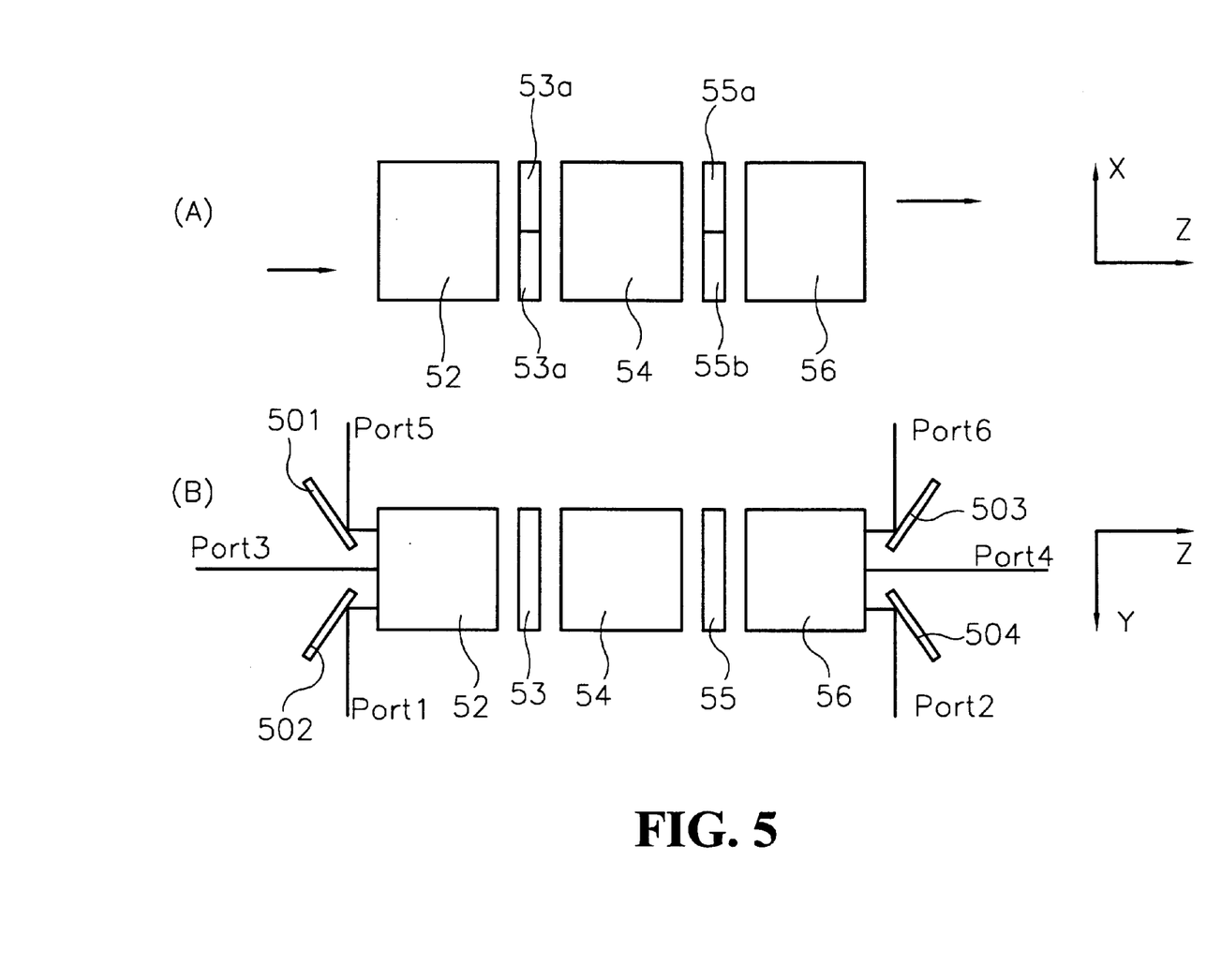
FIG. 5 shows a schematic diagram of a second embodiment of the transparent circulator in the present invention.

With reference to FIG. 5, a second embodiment of the transparent optical circulator in the present invention is illustrated in part (A) for the x-z plane and part (B) for the y-z plane. The components of the second embodiment are the same as those in the first embodiment except four reflective input/output devices 501, 502, 503, and 504, which are used to transform the incident light onto the circulator such that the number of the input/output ports may be up to six. The present invention has an advantage of reducing the total size over the conventional circulator.

Figure 6:
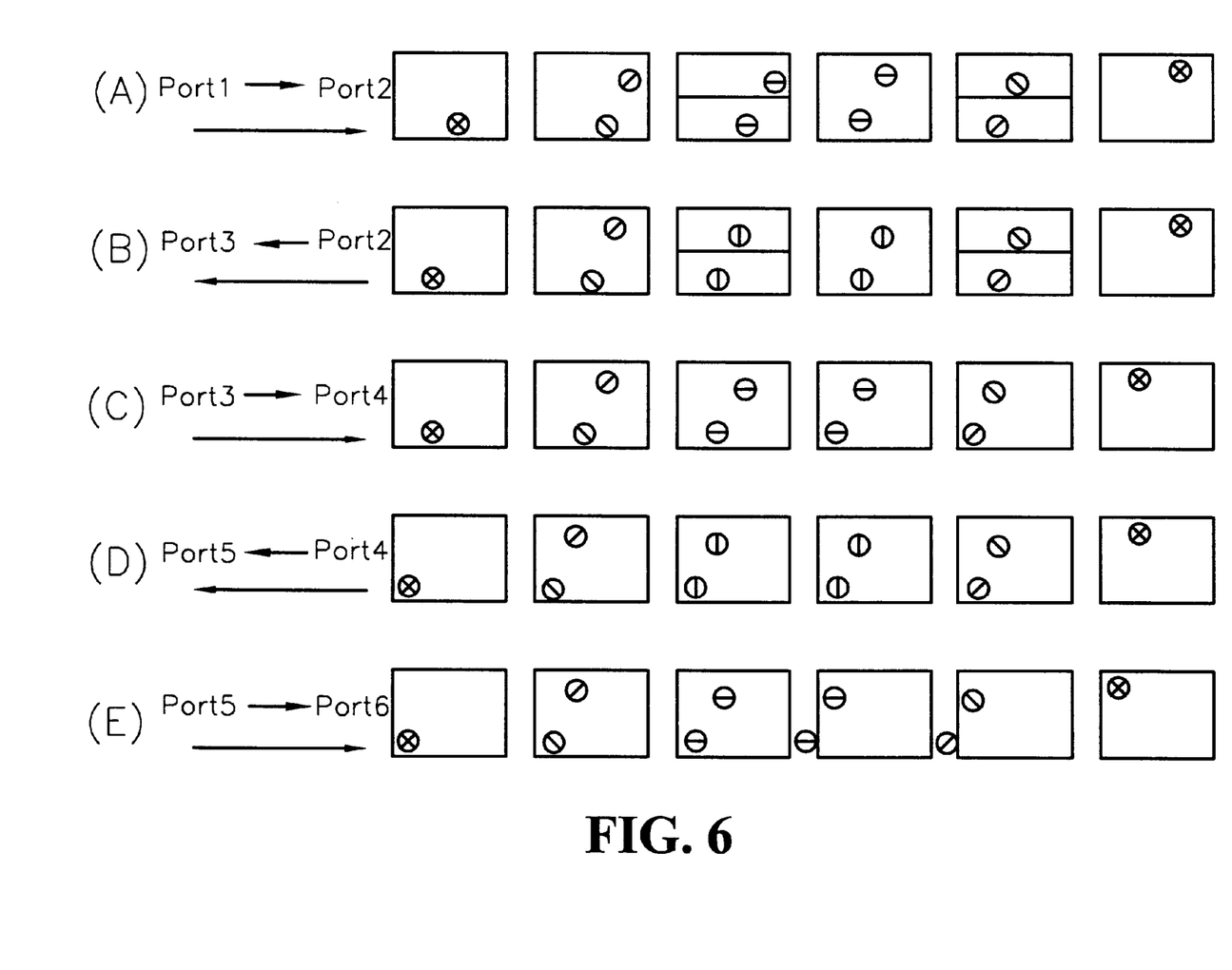
FIG. 6 illustrates the spot position of the optical signal on the respective optical component in FIG. 5.

For further explaining the conversions from port 1 to port 2, from port 2 to port 3, from port 3 to port 4, from port 4 to port 5, and from port 5 to port 6, the optic axes of the ordinary and extraordinary rays on the corresponding components are illustrated in (A), (B), (C), (D), and (E) with respect to the corresponding conversions. For the conversion from port 1 to port 2, A-1, A-2, A-3, A-4, A-5, and A-6 in FIG. 6(A) illustrate the optic polarization states of the ordinary and extraordinary rays for the reflective input/output device 502, the first birefringent crystal 52, the first pair of Faraday rotators 53, the second birefringent crystal 54, the second pair of Faraday rotators 55, and the third birefringent crystal 56 respectively. The processes for other conversions are similar and can be easily understood from FIG. 6.

The circulator has two reflective input/output devices so as to reduce the space between two adjacent input/output ports, and is greatly different from the conventional circulator which has larger size due to the size of a collimator used as an input/output device. Moreover, the two pairs of Faraday rotators vertically stacked in the present invention make the volume of the crystal much smaller so that the total size of the circulator is further reduced and the number of input/output ports is increased. An input/output device with zigzag reflective surfaces can be used to implement the circulator having more than six input/output ports.

Figure 7:
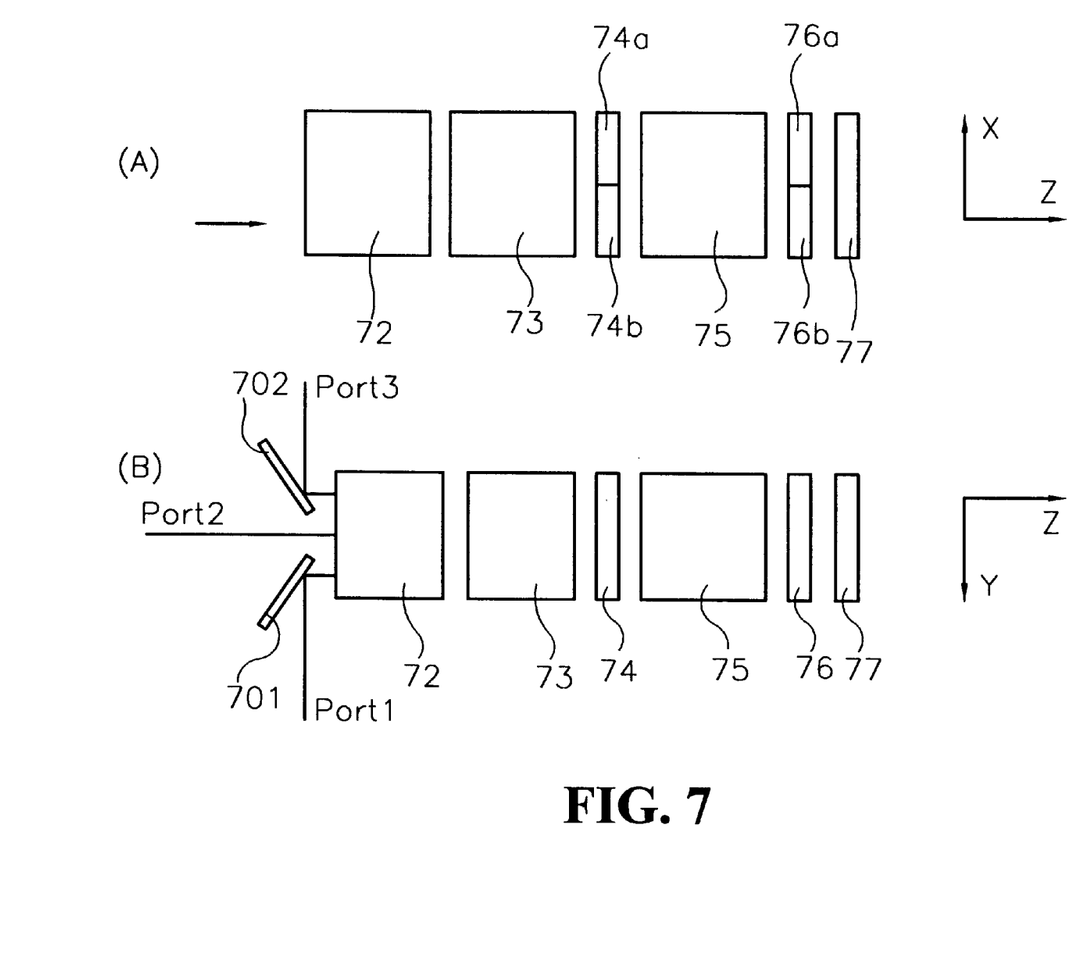
FIG. 7 shows a schematic diagram of a first embodiment of the reflective circulator in the present invention.

The embodiments as shown in FIG. 3 and FIG. 5 refer to the structure of a transparent optical circulator. With reference to FIG. 7, a first embodiment of the reflective optical circulator in the present invention is illustrated in part (A) for the x-z plane and part (B) for the y-z plane. The circulator includes two reflective input/output devices 701 and 702, a first front birefringent crystal 72, a second front birefringent crystal 73, a pair of first Faraday polarization rotators 74 (comprising 74a and 74b), a back birefringent crystal 75, a pair of second Faraday polarization rotators 76 (comprising 76a and 76b), and a reflective plate 77. The pair of first Faraday rotators 74 consists of two rotators 74a and 74b which are aligned in the X-axis and have opposite rotation directions, i.e., the two rotation directions are 45 degrees clockwise and counter clockwise respectively. The structure of the pair of second Faraday rotators 76 are the same as the structure of the pair of first Faraday rotators 74. The optic axis of the first front birefringent crystal 72 and the second front birefringent crystal 73 are 45 and –45 degrees respectively with reference to the Y-axis, and the optic axis of the back birefringent crystal 75 is oriented in the negative y direction.

Figure 8:
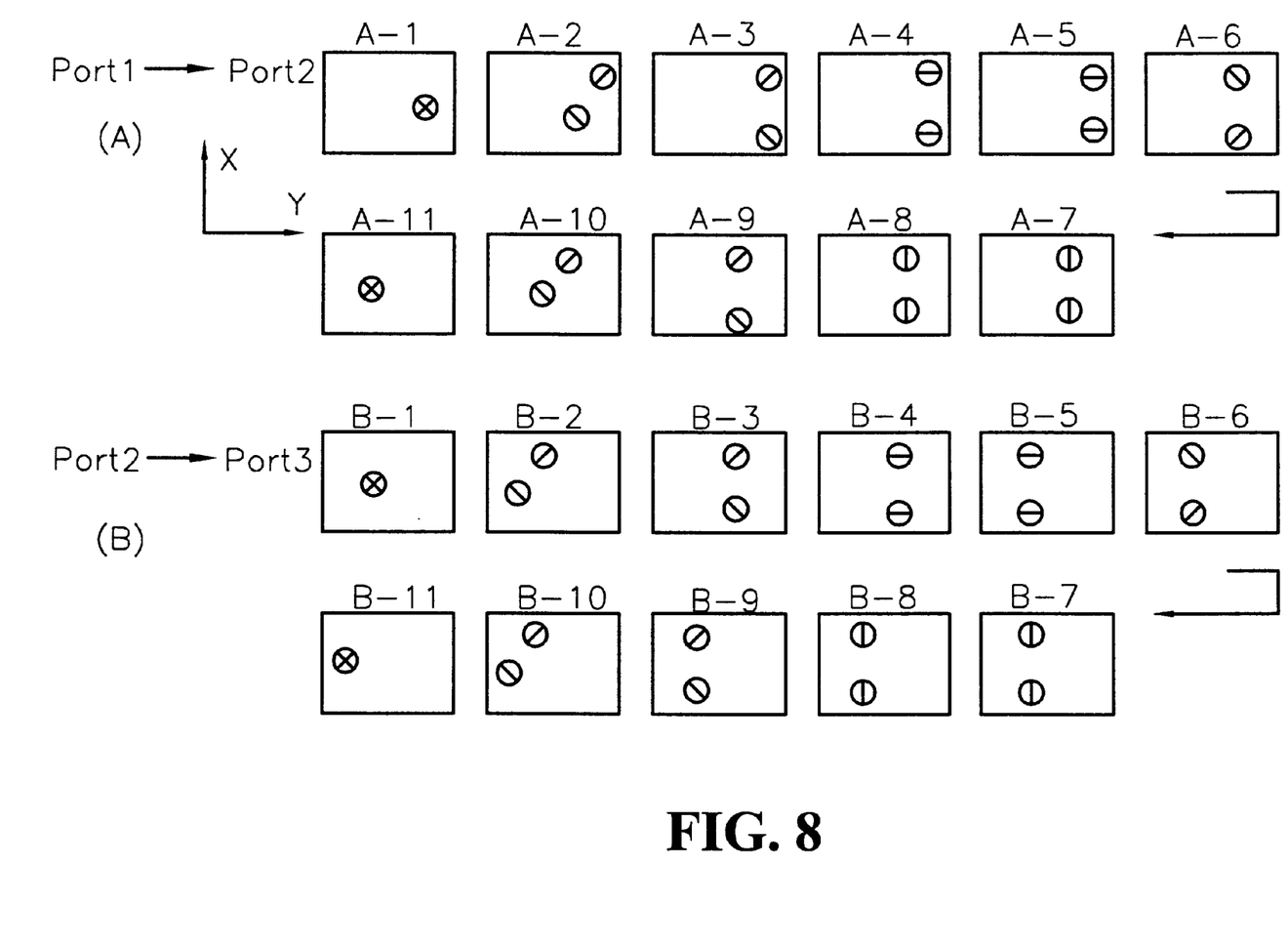
FIG. 8 illustrates the spot position of the optical signal on the respective optical component in FIG. 7.

FIG. 8 shows the respective spot positions and optic polarization states of the ordinary and extraordinary rays on the optical components in FIG. 7, where (A) and (B) of FIG. 8 illustrate the conversions from port 1 to port 2 and from port 2 to port 3 respectively. The propagation of the light towards the left in FIG. 7 is directed in the Z-axis.

The incident light onto port 1, which is reflected by the reflective input/output devices 701, passes through the first front birefringent crystal 72, the second front birefringent crystal 73, the pair of first Faraday polarization rotators 74, the back birefringent crystal 75, the pair of second Faraday polarization rotators 76, and the reflective plate 77 to complete the forward propagation. The respective spot positions and optic polarization states of the ordinary and extraordinary rays on the corresponding optical components are shown as A-1, A-2, A-3, A-4, A-5, and A-6 in FIG. 8.

Subsequently, the ordinary and extraordinary rays are reflected by the reflective plate 77, and pass through the pair of second Faraday rotators 76, the back birefringent crystal 75, the pair of first Faraday rotators 74, the second front birefringent crystal 73, and the first front birefringent crystal 72. The respective positions and optic polarization states are shown in A-7, A-8, A-9, A-10, and A-11. The two split rays, ordinary and extraordinary, are combined into a single ray to transfer to port 2, so a complete conversion from port 1 to port 2 is accomplished.

The conversion from port 2 to port 3 is similar to the above-mentioned process from port 1 to port 2. The respective positions and optic polarization states are shown in B-1, B-2, B-3, B-4, B-5, B-6, B-7, B-8, B-9, B-10, and B-11. Thus, a complete conversion from port 2 to port 3 is accomplished. The circulator has two reflective input/output devices in order to reduce the space between two adjacent input/output ports. The size advantage pointed out earlier for the transparent circulator also applies to the reflective circulator when compared to the conventional circulator that requires a collimator as an input/output device. Furthermore, the two rotators vertically stacked in the present invention also make the volume of the crystal much smaller so that the total size of the circulator is further reduced and the number of input/output ports is increased. In addition, the circulator is a three-staged device that has a higher degree of isolation and greatly improve the quality of the optical signal during propagation.

Figure 9:
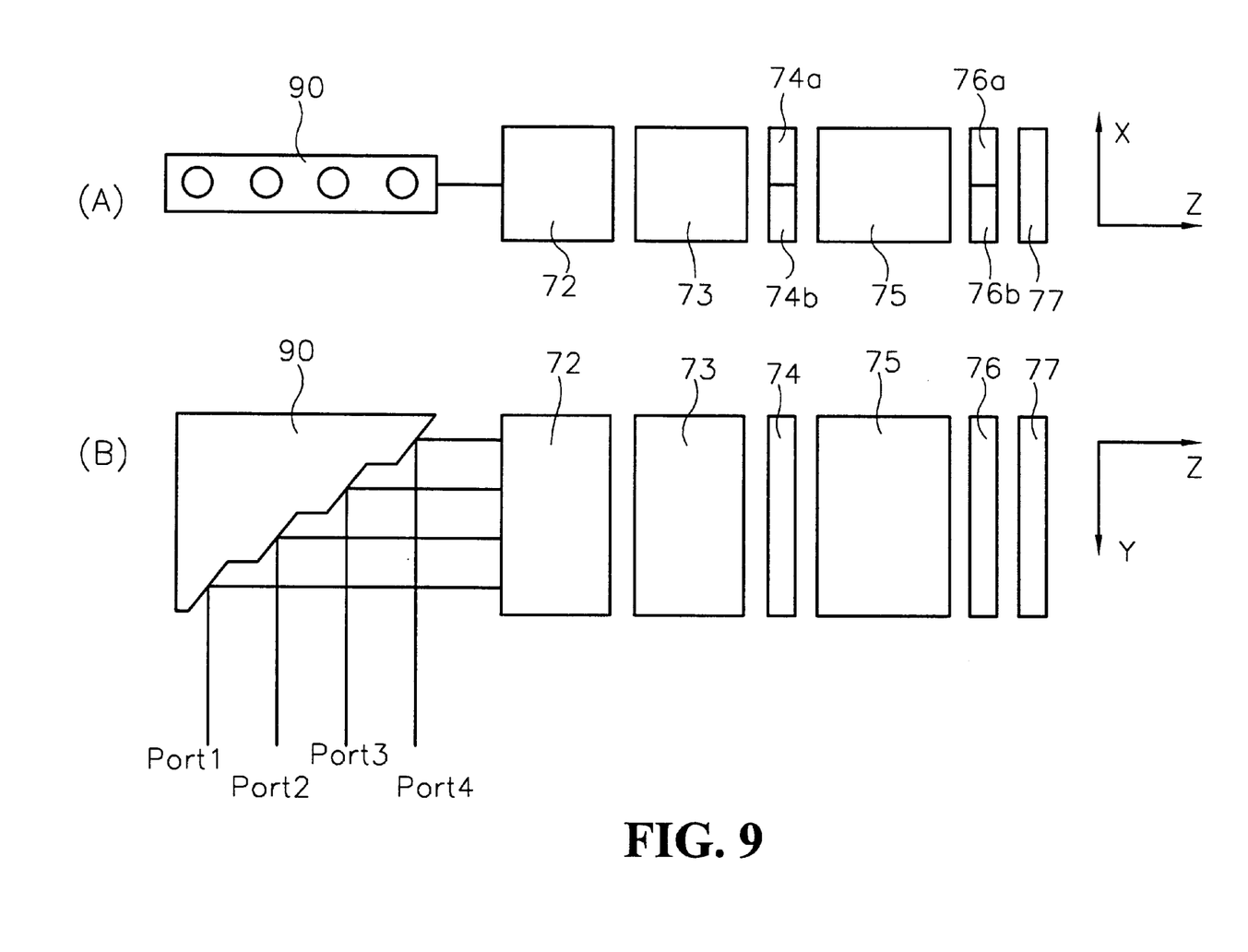
FIG. 9 shows a schematic diagram of a second embodiment of the reflective circulator in the present invention.

With reference to FIG. 9, a second embodiment of the reflective optical circulator in the present invention is illustrated in part (A) for the x-z plane and part (B) for the y-z plane. The components of the second embodiment are almost identical to the first embodiment except the reflective input/output device 90, which has a plurality of oblique planes used to guide the incident light onto the circulator such that the number of the input/output ports may be up to more than three. The present invention provides more input/output ports without having to increase the total size greatly as compared to the conventional circulator.

Figure 10:
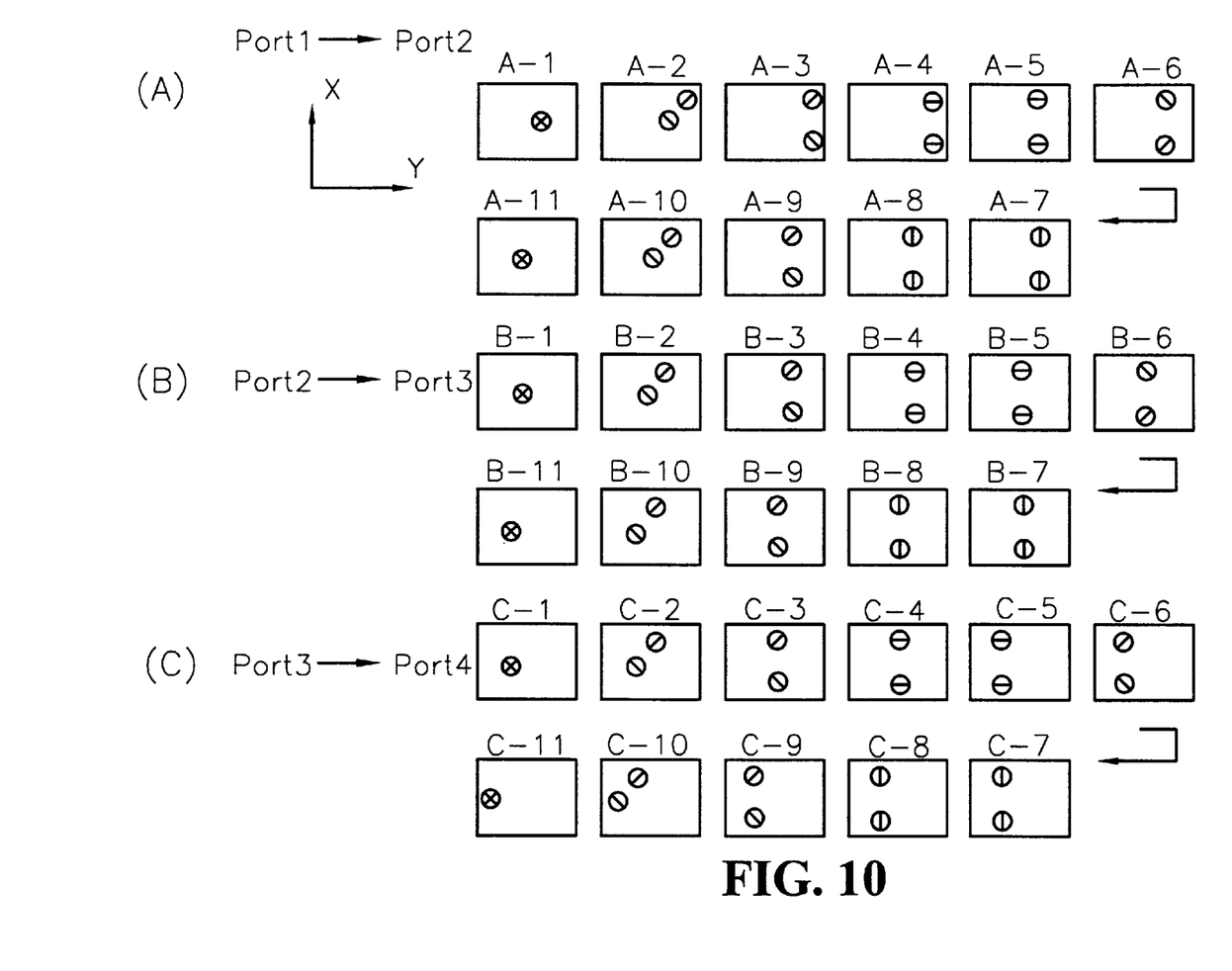
FIG. 10 illustrates the spot position of the optical signal on the respective optical component in FIG. 9.

For further explaining the conversions from port 1 to port 2, from port 2 to port 3, and from port 3 to port 4, the optic axes of the ordinary and extraordinary rays for the conversion from port 1 to port 2 are illustrated in (A), (B), and (C) of FIG. 10 when the light incident from the reflective input/output device 90 sequentially passes through the first front birefringent crystal 72, the second front birefringent crystal 73, the pair of first Faraday rotators 74, the back birefringent crystal 75, the pair of second Faraday rotators 76, the reflective plate 77, the pair of second Faraday rotators 76, the back birefringent crystal 75, the pair of first Faraday rotators 74, the second front birefringent crystal 73, and the first front birefringent crystal 72. The processes for other conversions are similar and will not be repeated.

Although only the preferred embodiments of this invention were shown and described in the above description, it is requested that any modification or combination that comes within the spirit of this invention be protected.

What is claimed is:

1. An optical circulator comprising a plurality of input/output ports, a first birefringent crystal having an optic axis in parallel with positive 45 degrees or 135 degrees to a Y axis, a first pair of Faraday polarization rotators for rotating the polarization of light by 45 degrees clockwise and counter clockwise respectively, a second birefringent crystal having an optic axis in parallel with said Y axis, a second pair of Faraday polarization rotators for rotating the polarization of light by 45 degrees clockwise and counter clockwise respectively, and a third birefringent crystal having an optic axis in parallel with positive 45 degrees or 135 degrees to said Y axis; wherein at least n of said input/output ports are provided, and said circulator transforms an incident light entering the first port into an output light at the second port, an incident light entering the second port into an output light at the third port, and an incident light entering the (n-1)th port into an output light at the nth port, n being a number greater than 2.

2. An optical circulator comprising a plurality of input/output ports, a first front birefringent crystal having an optic axis in parallel with positive 45 degrees or 135 degrees to a Y axis, a second front birefringent crystal having an optic axis in parallel with negative 45 degrees or 135 degrees to said Y axis, a first pair of Faraday polarization rotators for rotating the polarization of light by 45 degrees clockwise and counter clockwise respectively, a back birefringent crystal having an optic axis in parallel with said Y axis, a second pair of Faraday polarization rotators for rotating the polarization of light by 45 degrees clockwise and counter clockwise respectively, and a reflective plate; wherein at least n of said input/output ports are provided, and said circulator transforms an incident light entering the first port into an output light at the second port, an incident light entering the second port into an output light at the third port, and an incident light entering the (n-1)th port into an output light at the nth port, n being a number grater than 2.

* * * * *